US007240581B2

(12) United States Patent
Lee

(10) Patent No.: US 7,240,581 B2
(45) Date of Patent: Jul. 10, 2007

(54) INSTALLATION STRUCTURE OF BRAKE PEDAL

(75) Inventor: Chang-Hyun Lee, Suwon-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 485 days.

(21) Appl. No.: 10/911,724

(22) Filed: Aug. 4, 2004

(65) Prior Publication Data

US 2005/0076738 A1 Apr. 14, 2005

(30) Foreign Application Priority Data

Oct. 13, 2003 (KR) ...................... 10-2003-0071000

(51) Int. Cl.
*G05G 1/14* (2006.01)
*B60K 28/10* (2006.01)
*B60D 1/28* (2006.01)

(52) U.S. Cl. .......................... 74/512; 74/560; 180/274; 180/271

(58) Field of Classification Search .................. 74/512, 74/560; 384/428; 200/61.89; 180/271, 180/274, 275
See application file for complete search history.

(56) References Cited

U.S. PATENT DOCUMENTS 4,297,550 A * 10/1981 Leighton ................. 200/61.89
4,637,741 A * 1/1987 Gillet ......................... 384/428
5,829,317 A * 11/1998 Vreeken et al. ............... 74/560
6,446,525 B1 * 9/2002 Borchers ..................... 74/512
6,499,376 B2 * 12/2002 Thistleton et al. ............ 74/512
6,752,038 B2 * 6/2004 Cordero ....................... 74/512
6,889,575 B2 * 5/2005 Thistleton et al. ............ 74/512

FOREIGN PATENT DOCUMENTS

JP 11-1130 * 1/1999

* cited by examiner

*Primary Examiner*—Vinh T. Luong
(74) *Attorney, Agent, or Firm*—Morgan Lewis & Bockius LLP

(57) ABSTRACT

An installation structure releases a brake pedal in a vehicle collision. A pedal arm has a groove coupled with a pipe. A front portion of the groove has a smaller width than the pipe. Alternatively, a pedal arm is hingedly mounted on a support member. A connector secures the pedal arm to the support member for normal operation, and permits separation of the pedal arm from the support member in response to a reward force resulting from a collision impact. The support member has a cylindrical member, and the pedal arm defines a forward facing opening, force-fit onto the cylindrical member. The opening has a width smaller than the cylindrical member. Alternatively, the connector has two support plates on a pipe of the cylindrical member, at both sides of the pedal arm. The plates have rear-facing grooves, and coupling members protruding from the pedal arm are received in the grooves.

4 Claims, 4 Drawing Sheets

INSTALLATION STRUCTURE OF BRAKE PEDAL

CROSS-REFERENCE TO RELATED APPLICATIONS

This application claims priority of Korean Application No. 10-2003-0071000, filed on Oct. 13, 2003, the disclosure of which is incorporated fully herein by reference.

FIELD OF THE INVENTION

The present invention relates to an installation structure of a brake pedal incorporated in a vehicle. More particularly, the present invention relates to a pedal installation structure adapted to prevent injury to the lower parts of a driver due to a brake pedal, which pivotally thrusts toward the driver during a vehicle collision.

BACKGROUND OF THE INVENTION

In the event of a vehicle collision, the displacement of the master cylinder and booster disposed in the engine compartment can force the brake pedal to be pushed toward the driver, causing injury to the driver's legs.

SUMMARY OF THE INVENTION

Embodiments of the present invention provide an installation structure for a brake pedal adapted to automatically release a fixed state of the brake pedal to prevent impact transmission to the driver from the force of the pedal in a vehicle collision, thereby preventing or minimizing injury to the driver.

A preferred embodiment of the present invention comprises a hinge pipe. A pedal arm is formed with a hinge groove, wherein the hinge groove couples with the hinge pipe. A portion of the hinge groove opening toward the front of the vehicle has a smaller width than that of the outer diameter of the hinge pipe.

In an alternative embodiment, a brake pedal structure comprises a support member and a brake pedal arm. The brake pedal arm has a pedal at one end and is hingedly mounted on the support member at an opposite end. A connection means cooperates between the support member and pedal arm to secure the pedal arm for normal operation. The connection means also permits separation of the pedal arm from the support member in response to a reward force resulting from a collision impact. Preferably, the support member comprises a cylindrical member having a diameter and the brake pedal arm defines a forward facing opening configured and dimensioned to be force-fit onto the cylindrical member. In a further preferred embodiment, the opening has a width smaller than said cylindrical member diameter.

In another alternative embodiment, the cylindrical member comprises a hinge pipe and the connection means comprises two support plates mounted on the hinge pipe at both sides of the pedal arm. The plates have a plurality of coupling grooves opening toward a rear direction, and coupling members protruding from the pedal arm are received in the coupling grooves.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the attached drawings.

Figure 1:
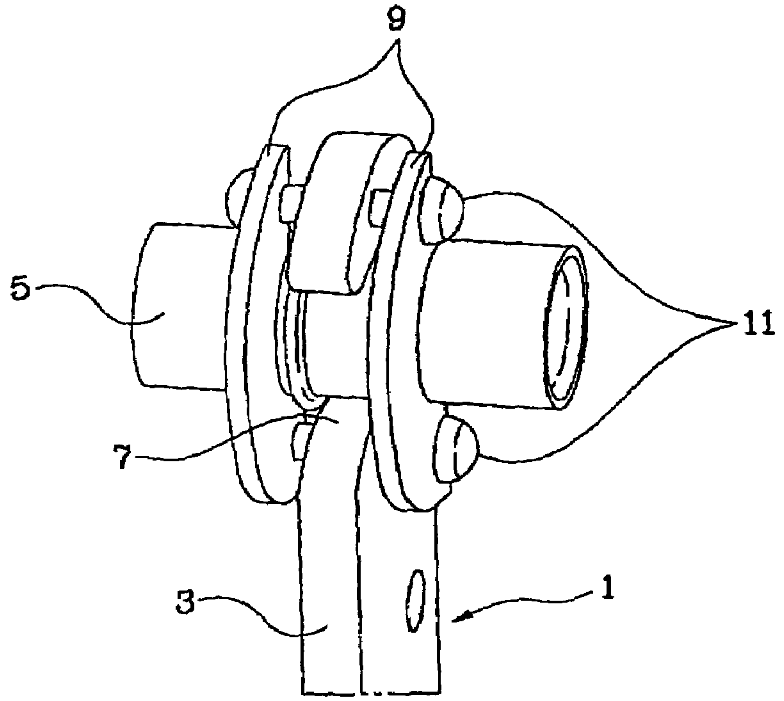
FIGS. 1 and 2 are perspective views of an installation structure of a brake pedal according to an embodiment of the present invention.
Figure 2:
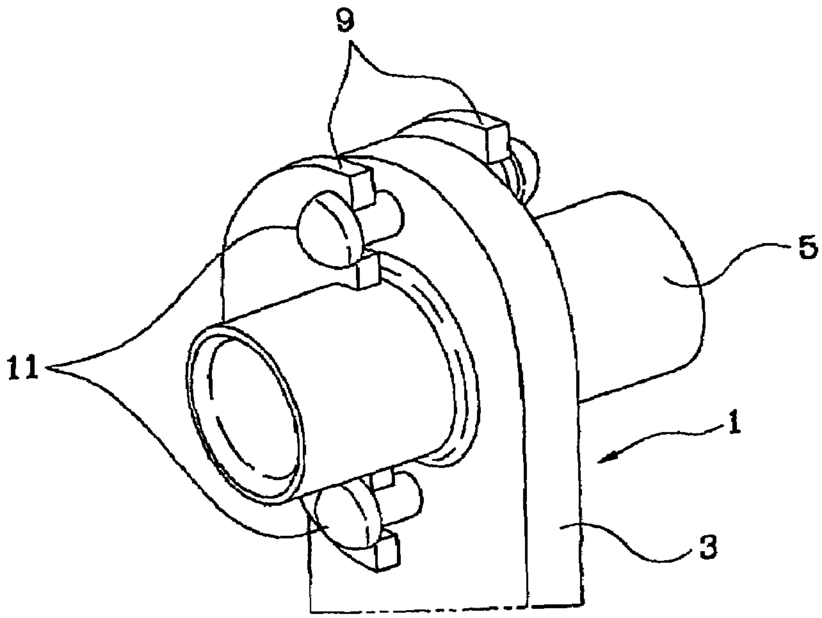
Figure 5:
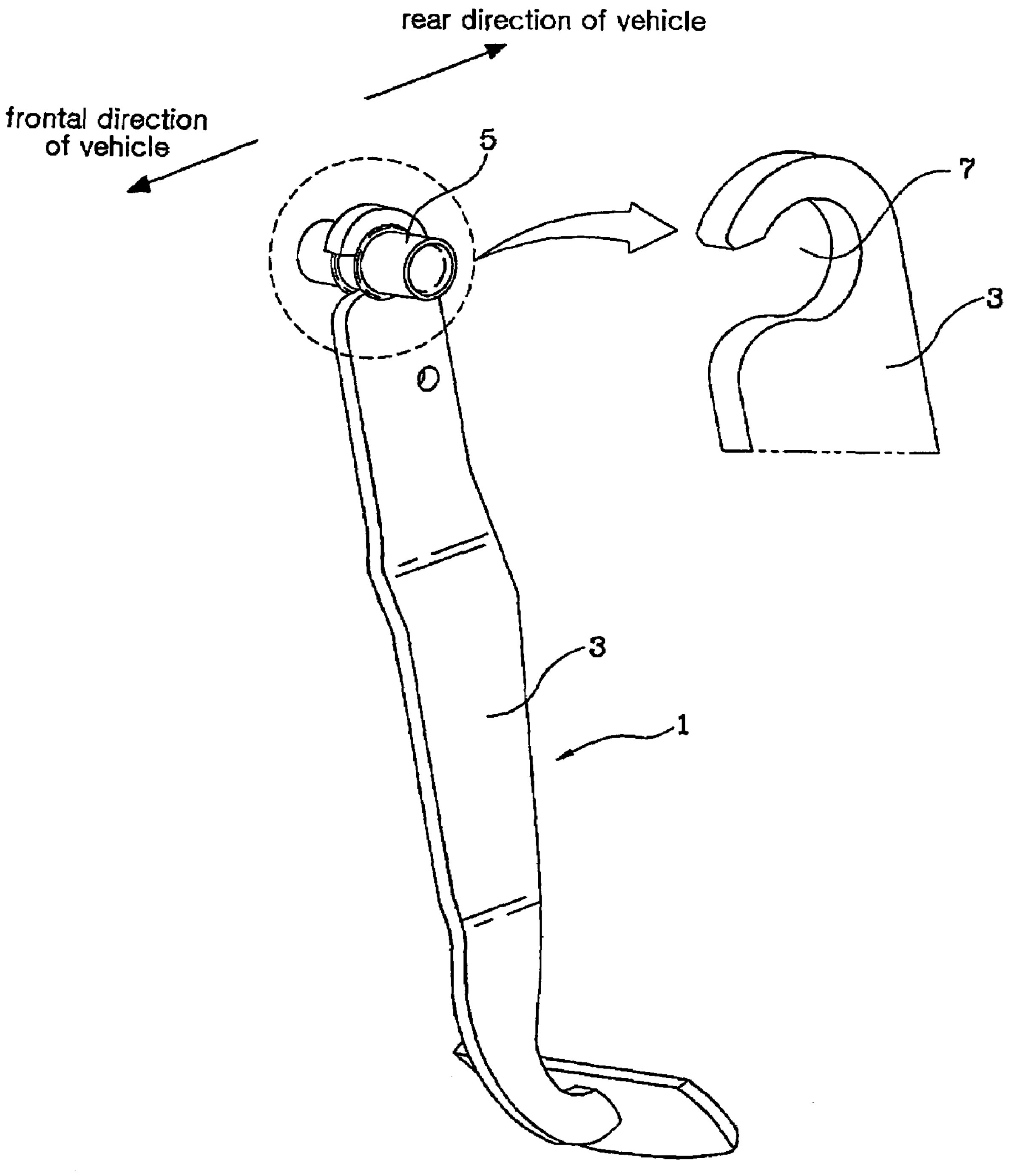
FIG. 5 is a perspective view of the coupling structure of a pedal arm and a hinge pipe.

Referring to FIGS. 1 and 2, a pedal arm 3 of a brake pedal 1 is pivotally coupled to a hinge pipe 5. With reference to FIG. 5, a hinge groove 7 of the pedal arm 3 couples with the hinge pipe 5 and a portion of the hinge groove 7 opened towards the front of the vehicle has a smaller width than that of the outer diameter of the hinge pipe 5. By way of reference, FIG. 5 describes only the hinge pipe 5 and the pedal arm 3 and omits illustrations of other components.

Once the hinge groove 7 of the pedal arm 3 is forcibly coupled with the hinge pipe 5, the pedal arm 3 is designed not to be separated by itself from the hinge pipe 5. However, when a vehicle accident occurs, the displacement of the master cylinder and booster forces the brake pedal 1 to be pushed toward the driver, and the hinge groove 7 of the pedal arm 3 is separated from the hinge pipe 5. Thus, the impact caused by the vehicle collision is transmitted away from the driver, thereby preventing injury to the driver.

Figure 3:
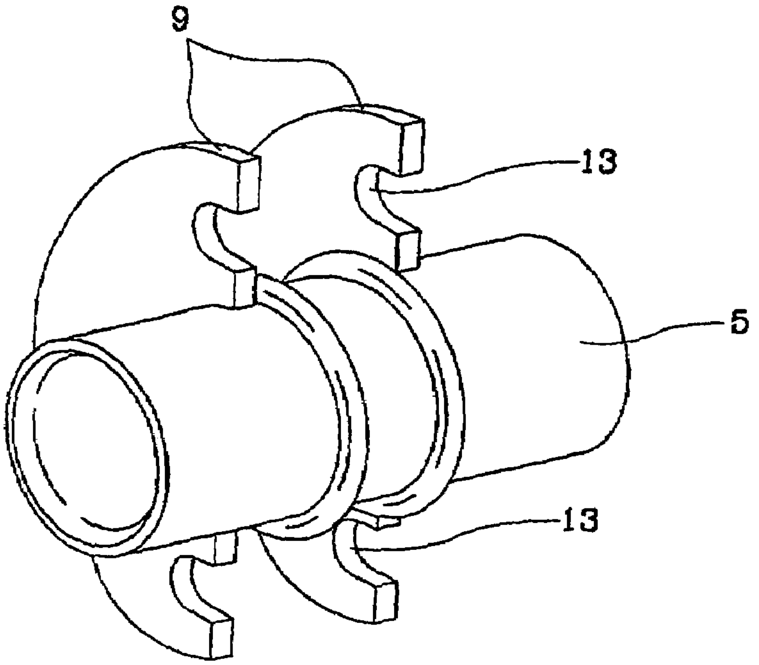
FIG. 3 is a perspective view illustrating a coupling state of a hinge pipe and supporting plates of FIG. 1.
Figure 4:
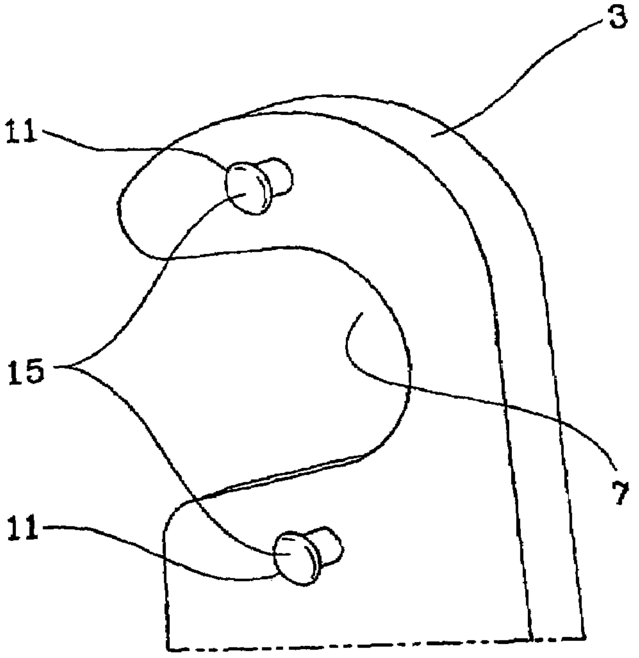
FIG. 4 is a perspective view of coupling members equipped at a pedal arm.

As illustrated in FIGS. 3 and 4, the hinge pipe 5 is equipped with supporting plates 9. The pedal arm 3 is provided with coupling members 11 for coupling with the supporting plates 9. The hinge pipe 5 and supporting plates 9 can either be coupled by welding or be initially integrally formed.

The supporting plates 9 and coupling members 11 prevent the pedal arm 3 from easily separating from the hinge pipe 5 under normal conditions, thereby obtaining a firm installation of the brake pedal 1. However, when a vehicle collision occurs, the supporting plates 9 and coupling members 11 allow the hinge groove 7 of the pedal arm 3 to decouple from the hinge pipe 5.

The supporting plates 9 are disposed at both sides of the pedal arm 3 and have a plurality of coupling grooves 13, which are opened toward the rear direction of the vehicle. The coupling members 11 are secured to the pedal arm 3 for being inserted into the coupling groove 13. The coupling members 11 have heads 15 closely adhering to lateral sides of the supporting plates 9. The coupling members 11 can be either a bolt, a rivet or the like. After the pedal arm 3 is coupled to the hinge pipe 5, the coupling members 11 can be coupled to the pedal arm 3 from both sides of the supporting plates 9.

Accordingly, when the pedal arm 3 is pushed toward the rear direction of the vehicle in a vehicle collision, the coupling members 11 are easily separated from the coupling groove 13 of the supporting plates 9. Therefore, the hinge groove 7 of the pedal arm 3 is able to be separated from the hinge pipe 5.

Under normal conditions, the coupling members 11 and supporting plates 9 are restricted from being separated from each other by a frictional force generated from a close adherence between the heads 15 of the coupling members 11 and the lateral side of the supporting plates 9. In short, the hinge groove 7 and the hinge pipe 5 can stably maintain the coupling state.

Figure 6:
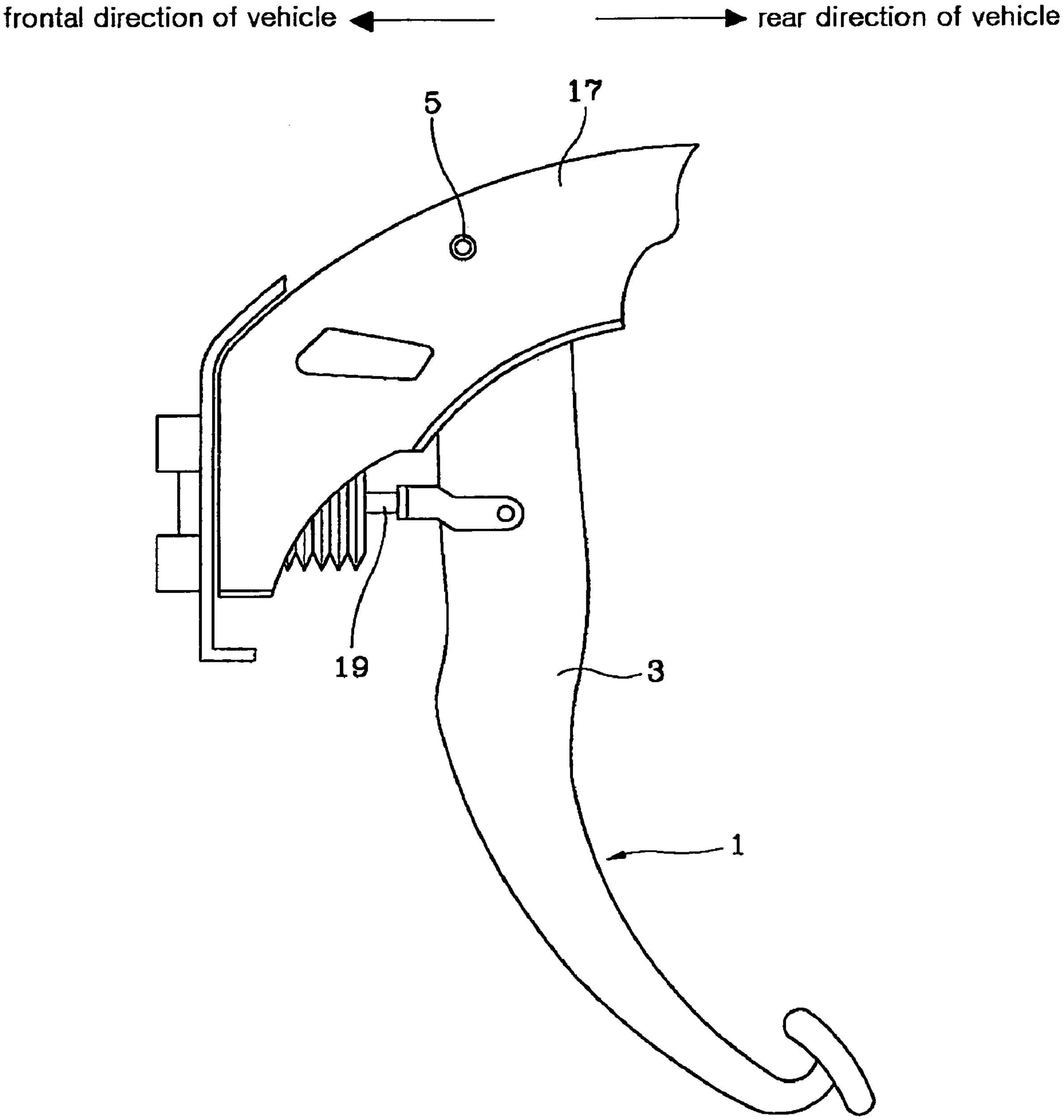
FIG. 6 is a side view of an installation structure of a brake pedal in an applied state according to an embodiment of the present invention.

With reference to FIG. 6, the hinge pipe 5 is supported at both ends by a mounting bracket 17. The supporting plates 9, coupling members 11 and the like are placed inside the mounting bracket 17, and the pedal arm 3 of the brake pedal 1 is connected with a push rod 19 connected with a booster or a master cylinder.

As apparent from the foregoing, there is an advantage in the present invention in that the brake pedal is stably installed under normal conditions, and when the pedal receives a thrusting force from the vehicle collision and transmits that impact to the driver, the brake pedal is automatically released from a fixed state, thereby preventing the pedal from impacting the driver and minimizing injury to the driver.

What is claimed is:

1. An installation structure of a brake pedal, the structure comprising:

a hinge pipe;

a pedal arm formed with a hinge groove, wherein said hinge groove is coupled to said hinge pipe, and a portion of said hinge groove opening toward a frontal direction of a vehicle has a smaller width than that of the outer diameter of said hinge pipe;

two supporting plates equipped on said hinge pipe disposed at both sides of said pedal arm and having a plurality of coupling grooves opening towards a rear direction of the vehicle; and coupling members inserted into said coupling grooves and fixed to said pedal arm.

2. The structure as defined in claim 1, wherein said coupling members are configured to have heads for closely adhering to lateral sides of said supporting plates.

3. A brake pedal structure, comprising:

a support member comprising a cylindrical member having a diameter and comprising a hinge pipe;

a brake pedal arm having a pedal at one end and being hingedly mounted on the support member at an opposite end, said brake pedal arm defining a forward facing opening at said opposite end, said opening being configured and dimensioned to be force-fit onto said cylindrical member; and connection means cooperating between the support member and pedal arm to secure the pedal arm for normal operation and to permit separation of the pedal arm from the support member in response to a reward force resulting from a collision impact, wherein said connection means comprises two support plates mounted on the hinge pipe at both sides of the pedal arm, said plates having a plurality of coupling grooves opening towards a rear direction, and coupling members protruding from said pedal arm received in said coupling grooves.

4. The brake pedal structure of claim 3, wherein said opening has a width smaller than said cylindrical member diameter.

* * * * *